June 15, 1926.

R. Z. DRAKE

Re. 16,361

LUMBER MOVING AND STORAGE MEANS

Original Filed Oct. 5, 1922 5 Sheets-Sheet 1

Inventor:
Robert Z. Drake
By Hiram A. Sturgen
Atty

June 15, 1926.

R. Z. DRAKE

Re. 16,361

LUMBER MOVING AND STORAGE MEANS

Original Filed Oct. 5, 1922 5 Sheets-Sheet 2

Inventor
Robert Z. Drake
By Hiram A. Sturges
Atty

June 15, 1926.

R. Z. DRAKE

Re. 16,361

LUMBER MOVING AND STORAGE MEANS

Original Filed Oct. 5, 1922 5 Sheets-Sheet 3

Inventor:
Robert Z. Drake
by Hiram A. Sturges
Atty

June 15, 1926.
R. Z. DRAKE
Re. 16,361
LUMBER MOVING AND STORAGE MEANS
Original Filed Oct. 5, 1922 5 Sheets-Sheet 4
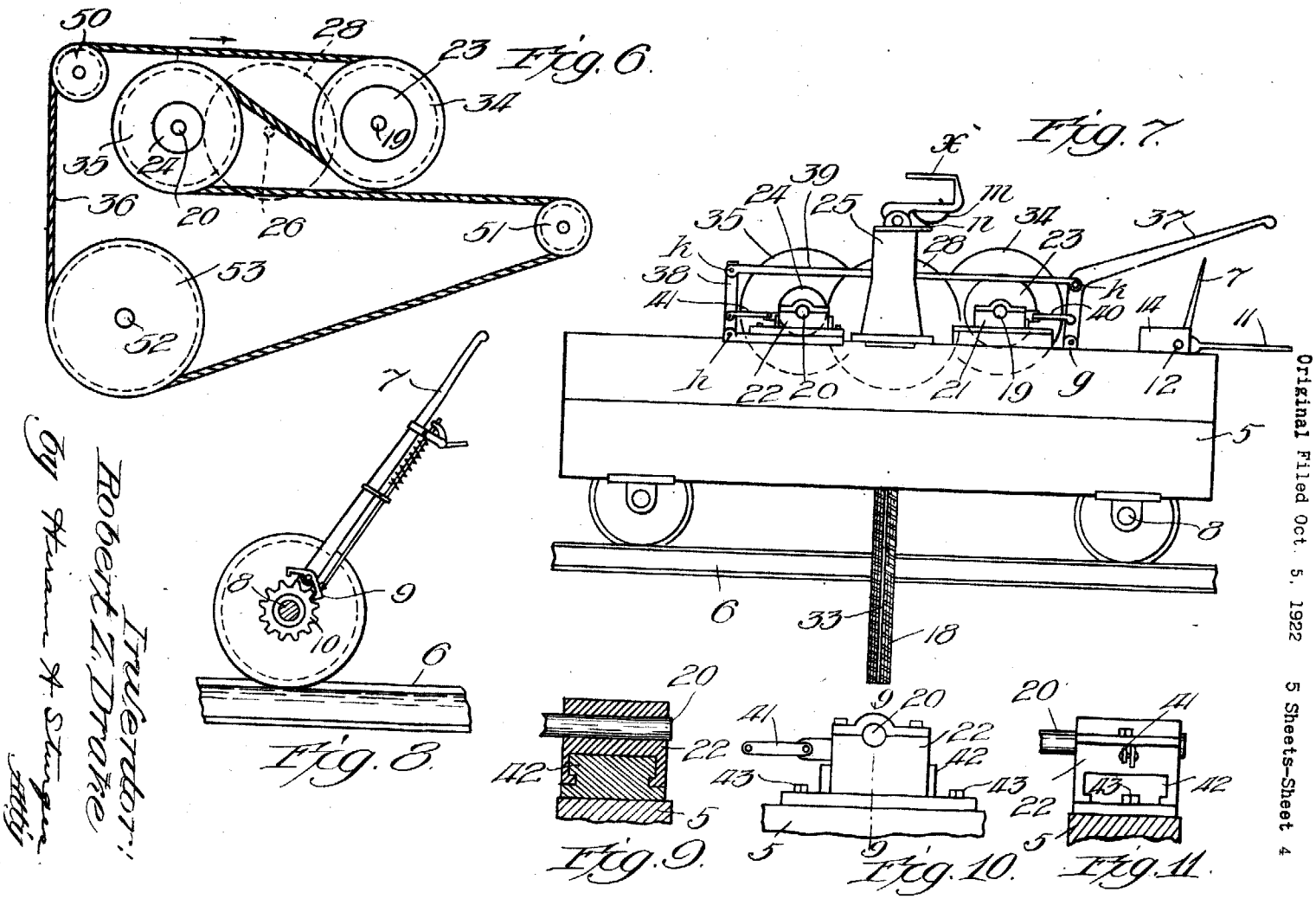
Inventor:
Robert Z. Drake
By Hiram A. Sturgis
Atty June 15, 1926.
R. Z. DRAKE
Re. 16,361
LUMBER MOVING AND STORAGE MEANS
Original Filed Oct. 5, 1922 5 Sheets-Sheet 5
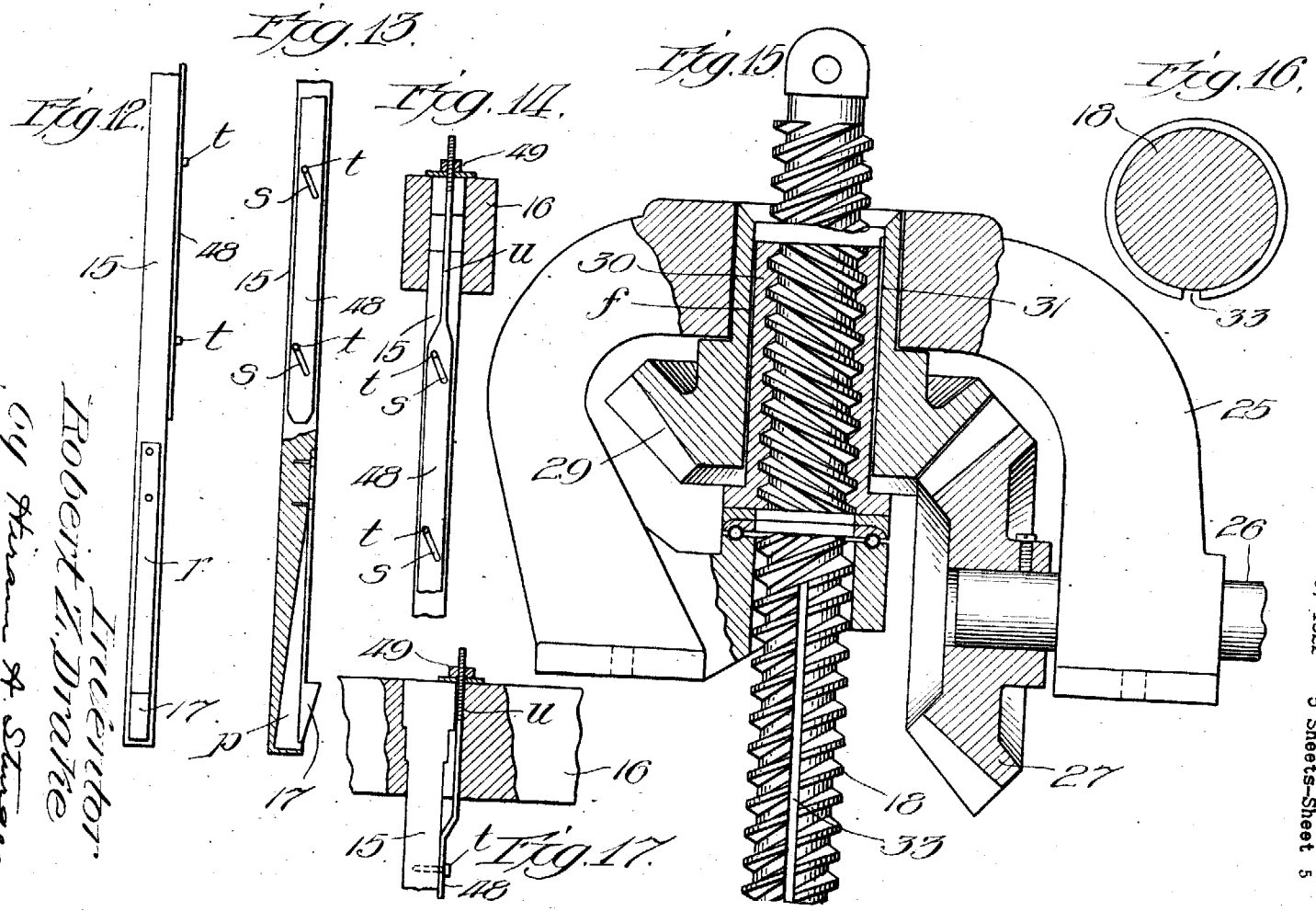
Inventor
Robert Z. Drake
By Hiram A. Sturges
Atty Reissued June 15, 1926. Re. 16,361

UNITED STATES PATENT OFFICE.

ROBERT Z. DRAKE, OF OMAHA, NEBRASKA.

LUMBER MOVING AND STORAGE MEANS.

Original No. 1,471,149, dated October 16, 1923, Serial No. 592,459, filed October 5, 1922. Application for reissue filed August 3, 1925. Serial No. 47,999.

This invention relates, broadly, to means for moving lumber which has been conducted to a seasoning house and for disposing and supporting it therein in such a manner that it will become seasoned uniformly and more quickly than ordinary, and where after seasoning it may be stored for any desired length of time. The use of the invention is particularly of advantage in connection with newly sawed lumber, such as boards or planks which generally carry a large per cent of moisture, and includes means for supporting the stored lumber horizontally upon hanger-bars so that approximately the entire surface of each board or plank may be exposed to the air; also it includes means for moving the lumber to the hanger-bars and for preventing warping. Other objects of the invention will appear in the description.

Figure 1:
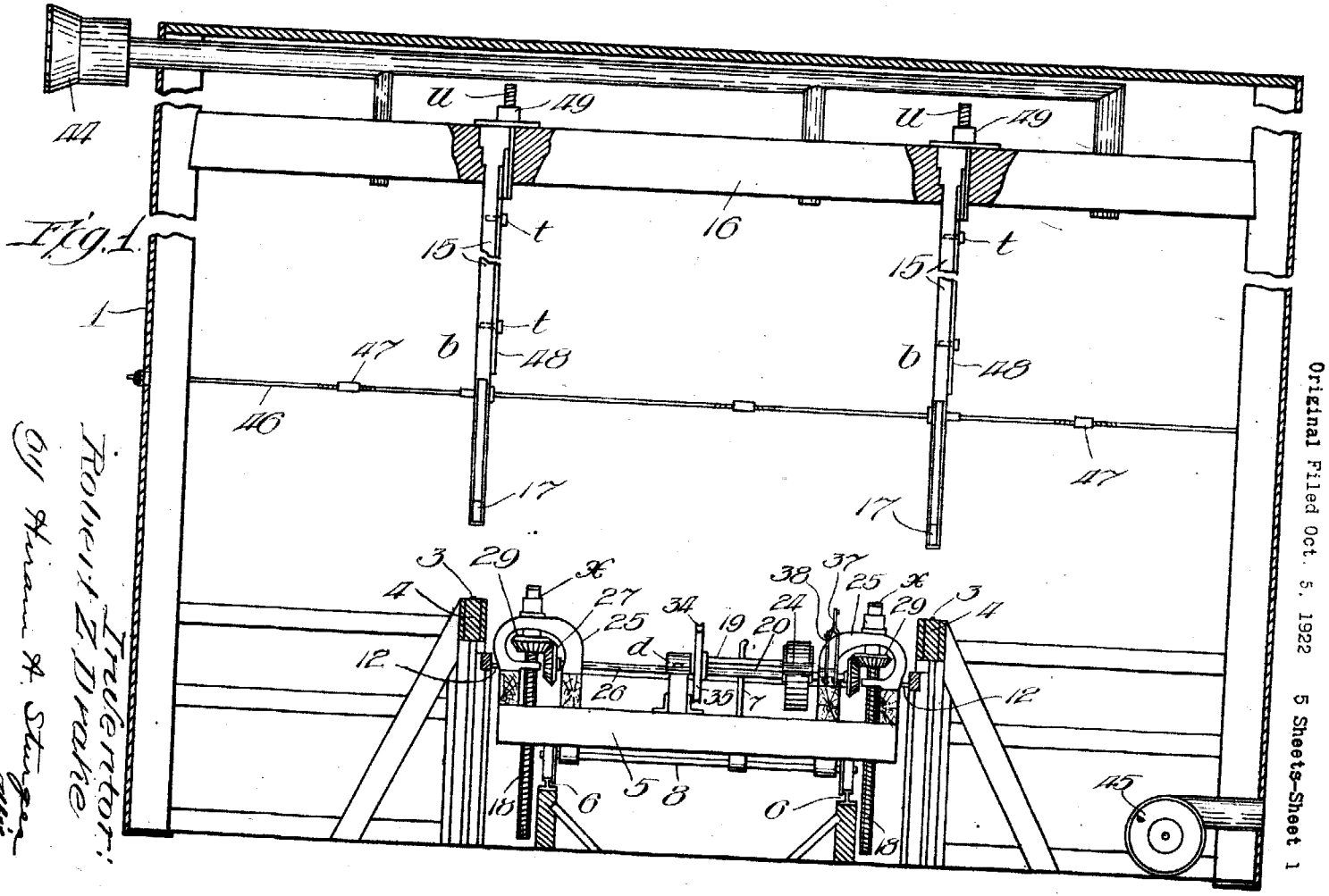
Figure 2:
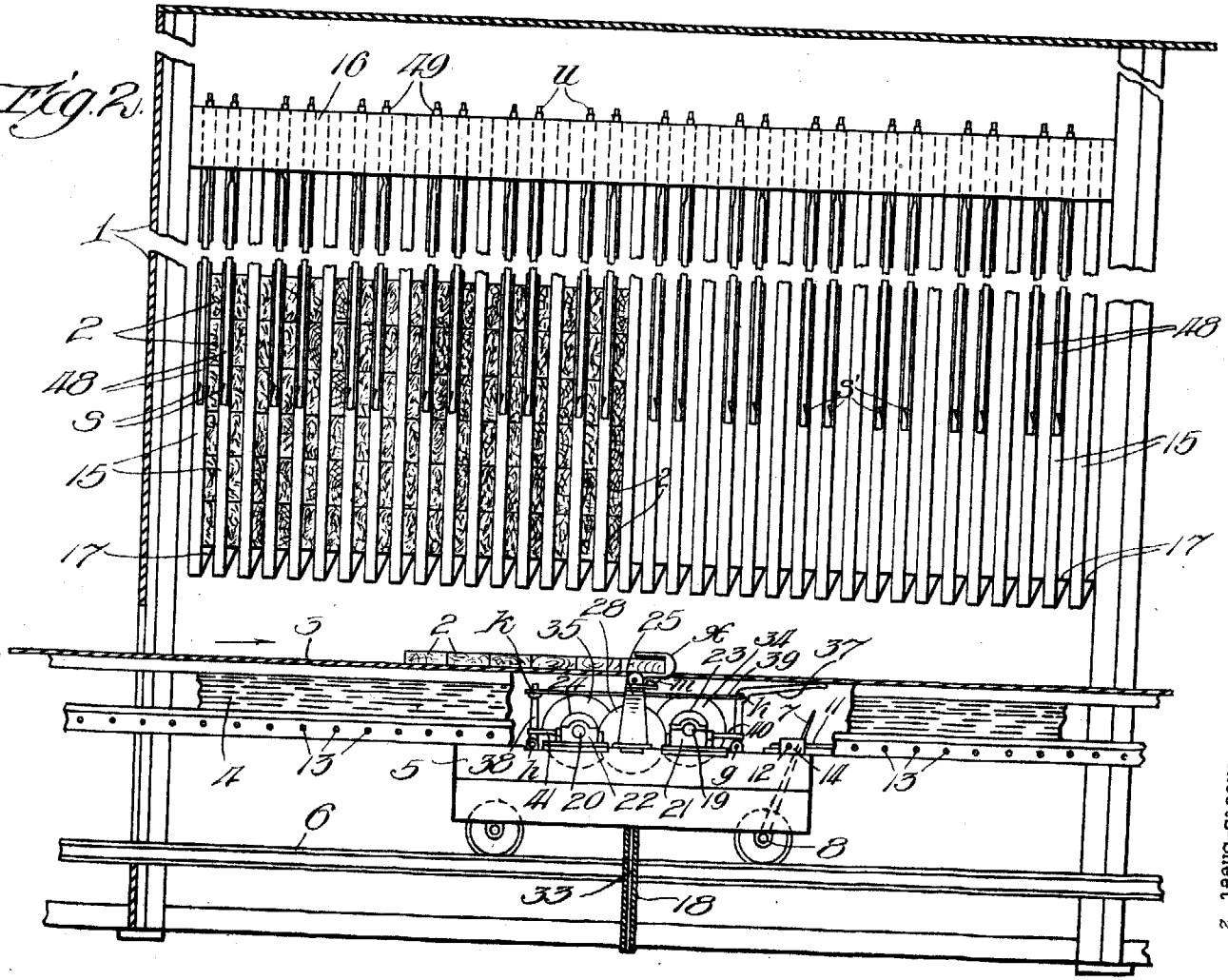
Figure 5:
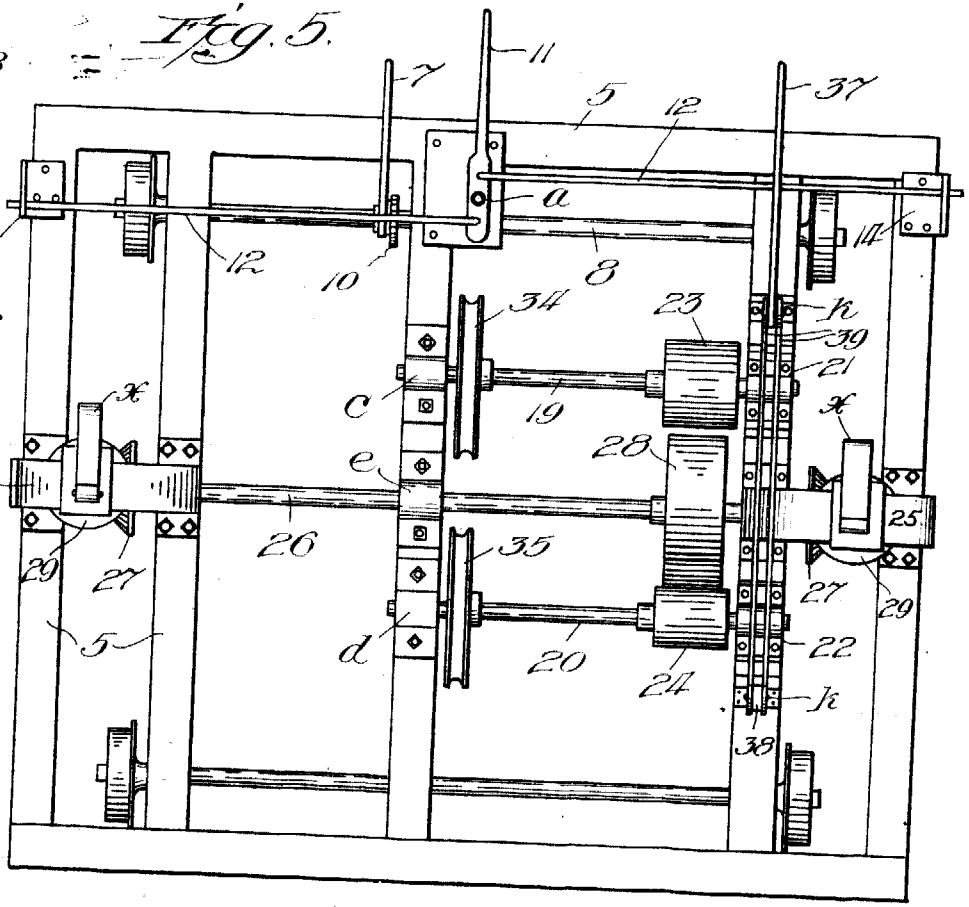
Figure 4:
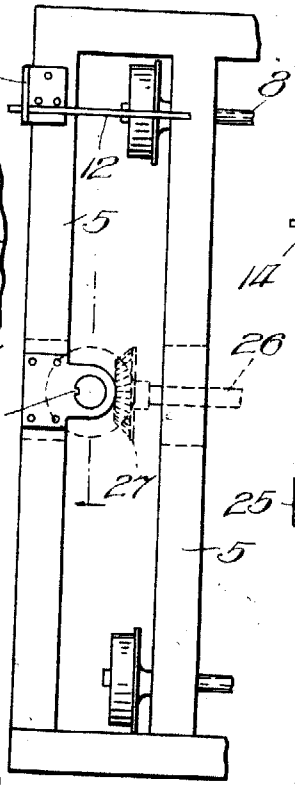
Figure 3:
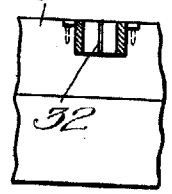

In the accompanying drawings which illustrate the invention, Fig. 1 is a transverse section through a seasoning-house showing means for elevating lumber and hanger-bars for supporting the same. Fig. 2 is a view showing a part of a seasoning-house in longitudinal section, together with the hanger-bars and elevating means shown in Fig. 1. Fig. 3 is a section on line 3—3 of Fig. 4. Fig. 4 is a broken away detail relating to Fig. 5 to show relative position of a stationary, lug-bearing block for engaging a screw. Fig. 5 is a plan view of a movable support or car and mechanism thereon for elevating lumber. Fig. 6 is a diagrammatic view showing the arrangement of a cable for revolving a pair of friction rollers reversely. Fig. 7 is a side view of the car. Fig. 8 is a side view of a hand lever for moving the car. Fig. 9 is a sectional view on line 9—9 of Fig. 10. Fig. 10 is a side view of a box providing bearings for the shaft of one of the transversely movable friction rollers. Fig. 11 is an end view of the parts shown in Fig. 10. Fig. 12 is a broken away side view of a hanger-bar. Fig. 13 is a view partly in section of the hanger-bar shown in Fig. 12, taken at right angles thereto. Fig. 14 is a broken view, partly in section, to clearly show the mounting of a crowder-bar for a hanger-bar. Fig. 15 is a broken view, partly in section, to show an arrangement of miter gears for rotating a sleeve. Fig. 16 is a view of the screw in transverse section. Fig. 17 is a detail showing the mounting of a crowder-bar, taken at right angles to the view shown in Fig. 14.

The invention is described in connection with a building or seasoning-house 1 for the storage of lumber, the boards or planks 2 being conducted therein upon cables 3 or other similar, flexible, transferring members which move upon adjacent, horizontal, parallel supports 4, any suitable means being provided for moving the cables.

Any suitable means may be used to elevate or lift the planks or boards from their position upon members 3, and the means herein shown will now be described. Numerals 5 indicate the frame of a movable support or car, said car being disposed between the supports 4 and adapted to be moved on a track 6 by use of a hand-lever 7 which is mounted upon an axle 8 of the car and provided with a pawl 9 (Fig. 8) for engaging a ratchet-wheel 10 fixed on said axle. Means are provided for maintaining the car in a stationary position relative to the supports 4, consisting of a rock-lever 11 (Fig. 5) having a pivotal mounting *a* upon the frame 5, and provided with pawl-rods 12 adapted to engage in apertures 13 which are formed in the supports 4, said rods traversing suitable aligning-brackets 14 which are secured to the frame 5, at the sides thereof.

In order that the boards or planks may be supported in the seasoning-house in such a manner that their sides will not be in engagement and that they may become quickly seasoned, I provide lumber-receiving elements or hanger-bars 15 which are secured at their upper ends to horizontal supporting plates 16, at or near the top of the seasoning-house, their lower ends being provided with spring-catches 17, said hanger-bars being approximately uniform as to length and disposed in rows or sections *b* (Fig. 1) parallel with the track and supports 4, the hanger-bars of each section *b* being disposed at uniform distances from each other, and their distance apart corresponding substantially to the thickness of the planks or boards or other kinds of lumber to be seasoned. While I have shown only two hanger-bars for each section, I may, of course, employ a greater number.

Means are provided for elevating the planks from the cables 3 to be disposed between the hanger-bars of the several sections *b*, consisting, in part, of an upright carrier shown herein as a pair of carrier-bars or screws 18 which do not revolve but are adapted to have sliding movements on the car, each screw being provided at its upper end with a pivotally mounted hook *x* for receiving a plank to be conducted upwardly for engaging the catches 17 of the hanger-bars of a section *b*.

In order that vertical reciprocation of the screws 18 may be effected I provide mechanism consisting, in part, of a pair of driven shafts 19 and 20 adapted to be rotated in reverse directions, these shafts having bearings upon the car for their respective inner ends, as indicated at *c* and *d*, the outer end of the shaft 19 having bearings in a movable box 21, and the outer end of the shaft 20 having bearings in a movable box 22. Numeral 23 indicates a friction roller which is fixed upon the driven shaft 19, and at 24 is indicated a friction roller which is fixed on the shaft 20.

Numerals 25 indicate a pair of yokes which are mounted upon the frame 5, midway between its ends and near the sides thereof, in planes between the shafts 19 and 20. At 26 is indicated an idler shaft having bearings approximately at the middle of the frame 5 as indicated at *e*, and having bearings near each of its ends in an arm of yokes 25, each end of said shaft 26 being provided with a miter gear wheel 27. Numeral 28 indicates a friction wheel which is fixed on the shaft 26, said wheel being disposed between the friction rollers 23 and 24.

Each yoke 25 is provided with an aperture *f* (Fig. 15) in which is loosely journalled a miter gear wheel 29 adapted to engage a gear-wheel 27, and at 30 (Fig. 15) is indicated an internally threaded sleeve 30, two of which are employed. Each sleeve 30 is disposed within a gear-wheel 29, and by use of a suitable key 31, is secured thereto, the grooves of each sleeve 30 being adapted to receive the spiral ridges of a screw 18. Numerals 32 indicate keys or lugs which are stationary with the frame 5, and each screw is provided, longitudinally, with a groove 33 adapted to receive a lug 32.

At 34 and 35 are indicated pulleys which are mounted on the respective shafts 19 and 20, and by use of a cable 36 (Fig. 6) engaging these pulleys and movable in one direction by any suitable means, the shafts 19 and 20 and their friction-rollers may rotate in reverse directions, their movements being constant during operation.

Any suitable means may be provided for causing a limited swinging movement, horizontally, of the shafts 19 and 20, to cause one of the rollers 23 or 24 to selectively engage the friction wheel 28, the means herein shown consisting, in part, of a hand-lever 37 having a pivotal connection *g* for its lower end with the frame 5, and a rock-lever 38 having a pivotal connection *h* with said frame, links 39 being employed and having pivotal connections for their respective ends, as indicated at *k* with the levers 37 and 38, a link 40 connecting the box 21 with the lever 37, and a link 41 connecting the box 22 with the lever 38. Numerals 42 indicate cores or bearing-plates (Figs. 7, 9, 10, 11.) upon which the boxes 21 and 22 may have their limited sliding movement, said plates being secured to the frame 5 by suitable keepers 43.

It will be understood that by use of the lever 37 a shaft 19 or 20 may be swung horizontally to cause its roller to engage the friction-wheel 28, and that only a slight movement will be required. If the lever 37 is swung upwardly, the links 39 and box 21 will move therewith to cause the friction-roller 23 to engage the friction-wheel 28 for rotating the shaft 26 and sleeves 30, the box 22 also moving and causing disengagement of the roller 24 from said wheel 28. Also it will be understood that a downward movement of the lever 37 will cause disengagement of the friction-roller 23 from the wheel 28, and will cause the roller 24 to engage said wheel 28 for rotating the shaft 26 in a direction reverse to that last mentioned. The vertical screws 18 are reversely threaded as compared with each other, the threads in the respective sleeves 30 also being reversely inclined.

Each hook *x* preferably is provided with a projection *m* adapted to rest on a block *n* of a yoke when the hooks are disposed in their normal position in the plane of the cables 3, and during operation, the planks 2 while disposed horizontally upon the cables 3, will be moved toward said hooks, the foremost plank moving into engagement therewith.

In operation, the pawl rods 12, by use of the lever 11, may be moved outwardly of the frame 5 for engaging in two opposed apertures 13 of the supports 4 at the sides of the car, and an operator by use of the lever 37 may cause one of the friction rollers to engage the friction wheel for revolving the shaft 26 and causing the miter gear wheels 29 and sleeves 30 to revolve, the result being that the screws 18 will slide upwardly. This upward movement of the screws permit the hooks *x* and the plank carried therewith to swing downwardly by gravity, the plank being elevated edgewise to a position between two adjacent hanger-bars 15 of a row or section *b* to be supported upon the spring-catches 17, each bar 15 being chamfered to provide a recess *p* (Fig. 13) to receive the spring *r* when the latter is pressed inwardly by the upward movement of the plank, each hook preferably having a convergent end portion as shown, to permit the plank to move upwardly to be engaged by the catches.

As soon as the plank last named has been elevated, the operator, by use of the lever 37, may cause a reverse rotation of the shaft 26 for causing the screws to slide downwardly, the projections *m* of the hooks *x* engaging the block *n* to automatically move said hooks to approximately a horizontal position for receiving a second plank from the moving cables 3; and the operation as described may be repeated for elevating the second plank, it being understood that when the second plank is moved upwardly upon the hooks *x*, its upper edge will engage the lower edge of the plank which is temporarily supported by the catches 17, and both of the planks will be elevated by the upward, sliding movements of the screws, and this upward movement of the screws may be continued until the second plank is engaged and supported by the catches 17; and operation as described may be repeated for elevating an additional number of planks until the hanger-bars of the section *b* support a desired number. The operator then, by use of the lever 7 may move the car a limited distance so that an additional number of planks may be elevated to be supported by hangers 15 of a section *b* next adjacent to the section mentioned, and operation may continue until the several hanger-bars support all of the plank to be seasoned. The hanger-bars 15 may have any desired length, depending upon the height of the seasoning-house.

In operation, the planks to be elevated are placed upon members 3 at, approximately, right-angles thereto, and by movement of members 3 the plank will be conducted to the hooks *x*, and any further movement of the planks will be prevented by the screws while the latter slide upwardly, and when the screws slide downwardly a plank will be moved into engagement with the hooks *x* by operation of members 3.

It will thus be seen that, as an economical feature, a single operator, by use of the mechanism described, is all that will be needed for elevating and storing the planks; also it will be appreciated that both sides of the planks will be exposed to the air, cool, dry air being preferred, although circulating air currents of any degree of temperature or humidity may be used, and seasoning of the lumber will be effected more quickly than ordinary, the arrangement of the hanger-bars being such that the areas between the sections *b* operate as vertical passageways for air, the width of each air passageway being equal to the thickness of a hanger-bar 15, subject to the control of certain crowder-bars 48 to be explained.

Numeral 44 (Fig. 1) indicates an intake for air, this being at or near the top of the seasoning-house, and by use of an exhaust fan 45, located at or near the bottom of the seasoning-house, air may be conducted out.

By reason of the construction each air passageway and hanger may have such width as would be made by any whole number of predetermined units. This predetermined unit is based by experience or experiment on the shrinkage due to seasoning and allowance for over or under sawing to produce, when seasoned, a board one inch in thickness.

Any suitable means may be provided for maintaining the hanger-bars of the several sections *b* in a vertical position. It is understood, of course, that the entire length, approximately, of the hanger-bars may be utilized for supporting the planks. The weight to be supported by the bars 15 of each section, therefore, may be considerable, and since the planks are to be elevated in such a manner that the sections *b* will become loaded in succession, and since the operation of loading the bars might cause vibration or swinging movements of the loaded sections *b*, it is possible that the bars 15 of the empty sections might be moved from their desired vertical position unless means were provided to prevent it. Any suitable means may be used for maintaining the hanger-bars of the sections *b* in a vertical position, the means herein shown for this purpose consist of stiffener-wires 46 which are secured to the sides of the seasoning-house and to the hanger-bars of a section *b*, and having threaded connections with turn-buckles 47. When the wires 46 have been adjusted by use of the turnbuckles they will be in a taut condition, and the hanger-bars for each section will remain in, approximately, a vertical position.

Any suitable means may be provided to prevent warping of the planks during the process of becoming seasoned, the means herein shown consisting of a plurality of vertically disposed crowder-bars 48, each having a width less than the width of a hanger-bar 15, and having slots *s* formed inclinedly therein for receiving guides or lag-bolts *t* which are mounted in said hanger-bars, means being provided for forcibly moving the bars upwardly to cause one of their edges to project outwardly from the hanger-bars to be pressed against one of the sides of the planks, the means for causing an upward movement of a bar 48, in the present instance, consisting of a nut 49 which is threaded on the shank *u* of a crowder-bar, and it is obvious that if the nuts 49 are rotated to cause an upward movement of the bars 48, they will be moved transversely of the bars 15, the bolts or guides *t* being stationary with the last named bars, and the transverse movement of the bars 48 will press the planks which are supported by a single hanger-bar against the hanger-bar adjacent thereto, the result being that warping of the planks, while becoming seasoned will be prevented.

It will be noted that the hanger-spacing may be changed by adjusting the crowder-bars, so that boards or planks of any thickness of which the predetermined unit is a multiple, may be raised and stored in the hanger space.

It will be noted, by referring to Fig. 2 of the drawing that the inclination of the slots *s* formed in the crowder-bars of approximately one-half of the hanger-bars are reverse to the inclination of the slots *s'* of the remaining crowder-bars, the object being to cause a pressure upon the planks toward the middle of the seasoning house.

Any suitable means may be provided for causing the shafts 19 and 20 to rotate in directions reverse to each other, the means herein shown in Fig. 6 of the drawings being the movable cable 36 engaging the pulley 34 and extending from the lower part of said pulley to the upper part of the pulley 35, any suitable number and arrangement of idler pulleys being employed and having suitable mountings for controlling direction and for supporting said cable, as pulleys 50 and 51, the cable being driven by any suitable means, as the rotatable shaft 52 provided with a pulley 53.

While members 18, which slide upwardly for conducting lumber to the hanger-bars have been shown and described as non-revoluble screws movable by revoluble sleeves, it is obvious that other equivalent means may be provided for elevating the lumber, and I do not wish to limit myself to these features. Also while I have specifically shown and described various details of construction to illustrate one embodiment of the invention, I do not wish to limit myself to the same, as I may make modifications and changes without departing from the spirit of my invention.

I claim as my invention,—

1. In lumber moving and storage means for a seasoning house, a plurality of hanger-bars disposed in approximately parallel, adjacent sections and secured in an upright position in the seasoning house, catch-members mounted on the hanger-bars, and an upright carrier below the hanger-bars movable for moving lumber between two sections of hanger-bars to be supported by said catch-members.

2. In lumber moving and storage means for a seasoning house, a plurality of upright hanger-bars arranged in adjacent sections and supported within the seasoning house, each bar having its lower end provided with a recess opening on one of its sides, springs mounted on the hanger-bars, each having a catch normally projecting outwardly of a recess, and an upright carrier below the hanger-bars movable for moving lumber between two sections of hanger-bars to be supported by the catches of said springs.

3. In lumber moving and storage means, a plurality of upright hanger-bars arranged in adjacently disposed sections, catch-members mounted on said bars, means for moving lumber between two sections of hanger-bars to be supported upon said catch-members, and means on the hanger-bars for pressing the lumber supported on the catch-members against the hanger-bars of an adjacent section.

4. In lumber moving and storage means for a seasoning house, upright hanger-bars within and having their upper ends secured to a part of the seasoning house and provided at their lower ends with catches, stiffener wires connecting the hanger-bars with the seasoning house for maintaining said bars in approximately a vertical position, and a carrier below the hanger-bars movable for moving lumber into engagement with said bars for a support on said catches.

5. In lumber moving and storage means for a seasoning house, a plurality of upright hanger-bars arranged in adjacently disposed sections and supported within the seasoning house, a plurality of crowder-bars supported within the seasoning house, each engaging a hanger-bar, catch-members mounted on the hanger-bars, a carrier movable for moving lumber between two sections of hanger-bars to be supported by said catch-members, means for moving the crowder-bars longitudinally of the hanger-bars, and co-operating elements on the crowder-bars and hanger-bars for moving the crowder-bars transversely of the hanger-bars to press the lumber supported by the catch members against the hanger-bars of an adjacent section.

6. In lumber moving and storage means for a seasoning house, hanger-bars stationary with and extending downwardly from the upper part of the seasoning house, catches resiliently mounted on the hanger-bars, and a pair of vertical carriers movable upwardly for conducting lumber to the catches of the hanger-bars.

7. In lumber moving and storage means for a seasoning house, hanger-bars stationary with and projecting downwardly from the upper part of the seasoning house, catch-members on the hanger-bars, upright carrier-bars below the hanger-bars, lumber receiving hooks, pivotally mounted on the carrier-bars, and means for moving the carrier-bars upwardly to move the lumber into engagement with the catch-members of the hanger-bars.

8. In lumber moving and storage means for a seasoning house, upright, stationary hanger-bars provided with catches and arranged in adjacently disposed sections, and means for elevating lumber to be disposed between the sections of hanger-bars in engagement with the catches of the bars of one of said sections.

9. In lumber moving and storage means for a seasoning house, hanger-bars within and projecting downwardly from a part of the seasoning house, catches on the hanger-bars, upright carrier-bars in a plane below the hanger-bars each provided with a pivotally mounted hook, horizontally movable cables for conducting lumber to the hooks of the carrier-bars, and means for moving the carrier-bars for conducting the lumber to the catches of the hanger-bars.

10. In lumber moving and storage means, the combination with lumber receiving elements, of a pair of upright carrier-bars having pivotally mounted hooks in a plane below said lumber receiving elements, a pair of cables movable for conducting lumber to said hooks, and means for moving the carrier-bars upwardly for conducting the lumber to said lumber receiving elements.

11. In lumber moving and storage means, the combination with lumber receiving elements, of a pair of movable cables for conducting lumber, a pair of upright carrier-bars having pivotally mounted hooks normally disposed in the plane of the movable cables for receiving the lumber, means for moving the carrier-bars upwardly to dispose their hooks above the plane of the movable cables for conducting the lumber to said lumber receiving elements, and means for moving the carrier-bars downwardly to dispose their hooks in the plane of the movable cables.

12. In lumber moving and storage means for a seasoning house, approximately parallel hanger-bars provided with catches and projecting downwardly from a part of the seasoning house, horizontally movable cables for conducting lumber, a car below the hanger-bars, upright carrier-bars mounted on the car for receiving the lumber from the movable cables, operating devices for moving the car, and means for moving the carrier-bars to conduct the lumber to the catches of the hanger-bars.

13. In lumber moving and storage means, a series of supporting sections providing spaces for receiving lumber, lumber elevating means below said sections and transversely movable with relation thereto to effect the transfer of lumber to each of said spaces selectively.

14. In lumber handling apparatus, a series of supporting sections providing spaces for receiving lumber, a carriage movable across the open ends of said spaces, and means on said carriage for conveying lumber into said spaces.

15. In lumber handling apparatus, a series of supporting sections providing spaces for receiving lumber, a carriage movable across the open ends of said spaces, and means on said carriage for conveying lumber into said spaces, said supporting sections comprising upright hanger bars, and means for retaining the lumber between adjacent sections after being elevated thereto.

16. In lumber handling apparatus, a plurality of depending hanger bars for receiving and supporting lumber therebetween, a conveyor for moving lumber across the ends of said hanger bars, and elevating means for moving said lumber between adjacent hanger bars to be supported thereby.

17. In apparatus of the class described a longitudinally movable conveyor, a conveyor below said carrier and selectively movable therealong, hoisting mechanism on the carriage, and means for actuating the hoisting mechanism for removing the load from the conveyor.

18. In apparatus of the class described, a longitudinally movable conveyor comprising a pair of parallel flexible members disposed in spaced relation for supporting and conveying a load, a carriage below said conveyor and movable therealong, and means on said carriage for elevating said load.

19. In apparatus of the class described a plurality of hanger bars arranged in spaced apart sections, a longitudinally movable conveyor below said hanger bars for conveying a load, a carriage below said conveyor and movable therealong, and elevating mechanism on said carriage for elevating the load from the conveyor to a position between adjacent sections of said hanger bars.

20. In apparatus of the class described a plurality of hanger bars arranged in spaced apart sections, a longitudinally movable conveyor below said hanger bars for conveying a load, a carriage below said conveyor and movable therealong, and elevating mechanism on said carriage for elevating the load from the conveyor to a position between adjacent sections of said hanger bars, and means for retaining said load between said sections upon descension of the elevating mechanism.

21. In lumber moving and storage apparatus, a series of supporting sections adapted to receive lumber therebetween, and means on certain of said sections for crowding the lumber against the adjacent section.

22. In lumber moving and storage apparatus, a series of supporting sections adapted to receive lumber therebetween, and means on certain of said sections for crowding the lumber against the adjacent section, said means comprising a laterally adjustable element on certain of said sections.

23. In lumber moving and storage apparatus, a series of supporting sections adapted to receive lumber therebetween, and means on certain of said sections for crowding the lumber against the adjacent section, said means comprising a plate mounted on each of said certain sections and having an inclined slot, a projection on the section extending through the slot, and means for forcibly moving said plate longitudinally to simultaneously force said plate sidewise of the section to crowd the lumber against the next adjacent section.

24. In lumber moving and storage means, a series of spaced supporting sections, a conveyor movable across the open end of said spaces, a carriage having means to receive a piece of lumber from said conveyor, mechanism for causing said lumber receiving means to advance forwardly to carry said piece of lumber into position between two of said sections, mechanism to cause said lumber receiving means to recede from its advanced position, and means to retain the lumber between said sections.

25. In lumber moving and storage means, a series of spaced supporting sections, a conveyor for moving lumber across the ends of said sections, a carriage movable laterally of said supporting sections and longitudinally of said conveyor, means on said carriage for receiving lumber from said conveyor and moving it to a position between two adjacent sections, means for returning said last mentioned means to its initial position, a retainer associated with said sections to hold the lumber therein, and locking elements for locking said carriage in position opposite any pair of sections desired.

26. In apparatus of the class desired, a series of spaced supporting sections, a carriage movable across the ends of said sections, a pair of carrier bars on said carriage, means to project and retract said carrier bars at will, a hook pivotally attached to the outer end of each of said bars, a conveyor for conveying pieces of lumber longitudinally of said carriage, means to cause said hooks to assume a position parallel to the plane of said conveyor when said carrier bars are retracted, so that a piece of lumber on said conveyor will be moved into said hooks, and means to cause said hooks and contained lumber to move into a plane parallel with said carrier bars as the latter begin their projecting movement, so as to carry said lumber edgewise between said supporting sections.

27. In apparatus of the class described, supporting sections, a carriage movable transversely of said sections, means on said carriage for moving lumber between said sections, and means for selectively locking said carriage in position opposite any of said sections desired.

28. In lumber moving and storage means, a plurality of upright hanger bars, means for moving lumber into position between said bars, and stiffening means for maintaining said bars in substantially a vertical position.

29. In apparatus of the class described, a carriage, carrier bars on said carriage, means to project and retract said carrier bars, and means on said carrier bars to receive lumber in a horizontal position when retracted and move same into a vertical edgewise position as the carrier bars are projected.

30. The method of loading lumber onto depending hanger bars arranged in sections, which consists in conveying pieces of lumber one at a time to a position below the hanger bar to be loaded, elevating said pieces individually and successively into the space between two of said sections, and applying retaining means for holding the raised piece against descent while another piece is being raised.

31. The method of storing lumber into depending spaced supporting sections, which consists in conveying the pieces of lumber from a distant point to a position immediately below one of said sections, then moving one of said pieces from a horizontal position to a vertical edgewise position, then elevating by power said last mentioned piece into the space between two adjacent sections, and applying releasable retaining means to hold said elevated pieces in position between said sections.

32. The method of moving and storing lumber into depending spaced supporting sections, which consists in conveying the pieces of lumber from a removed point successively to a position below one of said sections, then moving the first of said pieces from a flatwise to an edgewise position, then elevating said first piece into the space between two adjacent sections, holding said piece edgewise between said adjacent sections against descent while elevating edgewise the next piece till its upper edge meets the lower edge of the first piece and raises it till the lower edge of the second piece is held against descent by the holding means, and continuing these steps until the said space is filled to the desired extent.

In witness whereof I hereunto subscribe my name to this specification.

ROBERT Z. DRAKE.

Certificate of Correction.

It is hereby certified that in Reissue Letters Patent No. 16,361, granted June 15, 1926, upon the application of Robert Z. Drake, of Omaha, Nebraska, for an improvement in "Lumber Moving and Storage Means," errors appear in the printed specification requiring correction as follows: Page 5, line 88, claim 17, for the word "conveyor", second occurrence, read *carriage*, and line 89, same page and claim, for the word "carrier" read *conveyor;* and that the said Letters Patent should be read with these corrections therein that the same may conform to the record of the case in the Patent Office.

Signed and sealed this 3d day of August, A. D. 1926.

[SEAL.]

M. J. MOORE,
*Acting Commissioner of Patents.*